(12) United States Patent
Spence et al.

(10) Patent No.: US 9,757,702 B2
(45) Date of Patent: Sep. 12, 2017

(54) SYSTEMS AND METHODS FOR PURIFYING AND RECYCLING LEAD FROM SPENT LEAD-ACID BATTERIES

(71) Applicant: Johnson Controls Technology Company, Holland, MI (US)

(72) Inventors: Matthew A. Spence, Lindenhurst, IL (US); Patrick M. Curran, Laguna Niguel, CA (US)

(73) Assignee: Johnson Controls Technology Company, Holland, MI (US)

(*) Notice: Subject to any disclaimer, the term of this patent is extended or adjusted under 35 U.S.C. 154(b) by 288 days.

(21) Appl. No.: 14/498,771

(22) Filed: Sep. 26, 2014

(65) Prior Publication Data
US 2015/0367311 A1 Dec. 24, 2015

Related U.S. Application Data

(60) Provisional application No. 62/015,045, filed on Jun. 20, 2014, provisional application No. 62/015,042,
(Continued)

(51) Int. Cl.
*H01M 6/18* (2006.01)
*B01J 8/00* (2006.01)
(Continued)

(52) U.S. Cl.
CPC .............. *B01J 8/008* (2013.01); *B01J 6/001* (2013.01); *B01J 6/002* (2013.01); *C22B 3/02* (2013.01);
(Continued)

(58) Field of Classification Search
CPC ......... C22B 7/006; C22B 13/045; C22B 3/02; C22B 3/04; C22B 13/04; C22B 7/007;
(Continued)

(56) References Cited

U.S. PATENT DOCUMENTS 4,118,219 A   10/1978   Elmore et al.
4,220,628 A    9/1980   Kolakowski
(Continued)

FOREIGN PATENT DOCUMENTS

CA   2141906 A1   4/1996
CA   2319285 A1   3/2002
(Continued)

OTHER PUBLICATIONS

PCT International Search Report and Written Opinion for Application No. PCT/US2015/035257 mailed on Sep. 2, 2015.
(Continued)

*Primary Examiner* — Gary Harris
(74) *Attorney, Agent, or Firm* — Fletcher Yoder, P.C.

(57) ABSTRACT

The present disclosure relates to systems and methods by which lead from spent lead-acid batteries may be extracted, purified, and used in the production of new lead-acid batteries. The system includes a first phase separation device configured to: receive the first mixture from the basic lead stream digestion device, isolate a liquid component from one or more insoluble components of the first mixture, and output the liquid component. The system also includes a lead salt precipitation device configured to: receive and mix the liquid component and a carboxylate source to form a second mixture including a lead salt precipitate, and output the second mixture. The system further includes a second phase separation device configured to: receive the second mixture from the lead salt precipitation device, isolate the liquid component from the lead salt precipitate of the second mixture, and output the lead salt precipitate.

28 Claims, 9 Drawing Sheets

Related U.S. Application Data filed on Jun. 20, 2014, provisional application No. 62/015,058, filed on Jun. 20, 2014, provisional application No. 62/015,070, filed on Jun. 20, 2014.

(51) Int. Cl.
*B01J 6/00* (2006.01)
*C22B 3/00* (2006.01)
*C22B 7/00* (2006.01)
*C22B 3/02* (2006.01)
*C22B 3/04* (2006.01)
*H01M 6/52* (2006.01)
*H01M 10/54* (2006.01)

(52) U.S. Cl.
CPC ............... *C22B 3/04* (2013.01); *C22B 7/006* (2013.01); *C22B 7/007* (2013.01); *C22B 13/04* (2013.01); *C22B 13/045* (2013.01); *H01M 6/52* (2013.01); *H01M 10/54* (2013.01); *B01J 2208/00805* (2013.01); *Y02P 10/234* (2015.11); *Y02W 30/84* (2015.05)

(58) Field of Classification Search
CPC ... B01J 6/001; B01J 6/002; B01J 8/008; B01J 2208/00805; H01M 6/52; H01M 10/54; Y02W 30/84; Y02P 10/234
USPC ........................................................ 429/304
See application file for complete search history.

(56) References Cited

U.S. PATENT DOCUMENTS

| | | | |
|---|---|---|---|
| 4,269,811 A | 5/1981 | Striffler, Jr. | |
| 4,336,236 A | 6/1982 | Kolakowski et al. | |
| 5,292,456 A | 3/1994 | Francis et al. | |
| 5,342,449 A | 8/1994 | Holbein et al. | |
| 5,429,661 A | 7/1995 | Khodov et al. | |
| 5,460,730 A | 10/1995 | Czerny et al. | |
| 5,514,263 A | 5/1996 | Spijkerman et al. | |
| 5,630,931 A | 5/1997 | Manequini | |
| 5,690,718 A | 11/1997 | Sabin | |
| 5,827,347 A | 10/1998 | Margulis | |
| 5,840,262 A | 11/1998 | Margulis | |
| 5,879,830 A | 3/1999 | Olper et al. | |
| 5,944,869 A | 8/1999 | Modica et al. | |
| 6,110,433 A | 8/2000 | Kleinsorgen et al. | |
| 6,150,050 A | 11/2000 | Mathew et al. | |
| 6,190,626 B1* | 2/2001 | Cashman ............ A62D 3/38 252/182.32 | |
| 6,471,743 B1 | 10/2002 | Young et al. | |
| 7,090,760 B2 | 8/2006 | Seo et al. | |
| 7,498,012 B2 | 3/2009 | Olper et al. | |
| 7,507,496 B1 | 3/2009 | Kinsbursky et al. | |
| 7,608,178 B2 | 10/2009 | De Jonghe et al. | |
| 7,713,502 B2 | 5/2010 | Koehler et al. | |
| 7,772,452 B2 | 8/2010 | Modica | |
| 7,799,294 B2 | 9/2010 | Kordosky et al. | |
| 7,833,646 B2 | 11/2010 | Zenger et al. | |
| 8,147,780 B2 | 4/2012 | Martini | |
| 8,323,376 B2 | 12/2012 | Kumar et al. | |
| 8,323,595 B1* | 12/2012 | Smith ............ C01G 21/06 423/473 | |
| 8,562,923 B1 | 10/2013 | Smith et al. | |
| 2006/0239903 A1 | 10/2006 | Guerriero et al. | |
| 2007/0028720 A1 | 2/2007 | Sommariva et al. | |
| 2010/0040938 A1* | 2/2010 | Kumar ............ C22B 3/165 429/49 | |
| 2010/0043600 A1 | 2/2010 | Martini | |
| 2010/0143219 A1 | 6/2010 | Chow | |
| 2011/0129410 A1 | 6/2011 | Trindade | |
| 2012/0186397 A1 | 7/2012 | Martini | |
| 2013/0064743 A1 | 3/2013 | Laurin et al. | |

FOREIGN PATENT DOCUMENTS

| | | |
|---|---|---|
| CN | 1357938 | 7/2002 |
| CN | 1451771 | 10/2003 |
| CN | 1470675 | 1/2004 |
| CN | 1601805 | 3/2005 |
| CN | 1812183 | 8/2006 |
| CN | 101104887 | 1/2008 |
| CN | 101104890 | 1/2008 |
| CN | 101205080 | 6/2008 |
| CN | 201071389 | 6/2008 |
| CN | 101250720 | 8/2008 |
| CN | 101291008 | 10/2008 |
| CN | 101318692 | 12/2008 |
| CN | 101345328 | 1/2009 |
| CN | 101414698 | 4/2009 |
| CN | 101488597 | 7/2009 |
| CN | 101514395 | 8/2009 |
| CN | 101540395 | 9/2009 |
| CN | 101608264 | 12/2009 |
| CN | 101613803 | 12/2009 |
| CN | 101615707 | 12/2009 |
| CN | 101748277 | 6/2010 |
| CN | 101759158 | 6/2010 |
| CN | 101771181 | 7/2010 |
| CN | 101792176 | 8/2010 |
| CN | 101831668 | 9/2010 |
| CN | 101899576 | 12/2010 |
| CN | 101994007 | 3/2011 |
| CN | 102020374 | 4/2011 |
| CN | 102020375 | 4/2011 |
| CN | 102031380 | 4/2011 |
| CN | 102162034 | 8/2011 |
| CN | 102306855 | 1/2012 |
| CN | 102306856 | 1/2012 |
| CN | 102351217 | 2/2012 |
| CN | 102396099 | 3/2012 |
| CN | 102427149 | 4/2012 |
| CN | 202285265 | 6/2012 |
| CN | 102560122 | 7/2012 |
| CN | 102560535 | 7/2012 |
| CN | 103050745 | 4/2013 |
| DE | 69905134 T2 | 10/2003 |
| EP | 0905810 A2 | 3/1999 |
| EP | 1656463 A1 | 5/2006 |
| EP | 1684369 A1 | 7/2006 |
| EP | 1728764 A1 | 12/2006 |
| EP | 2182569 A1 | 5/2010 |
| EP | 2312686 A1 | 4/2011 |
| EP | 2333895 A1 | 6/2011 |
| EP | 2450991 A1 | 5/2012 |
| EP | 2604711 A1 | 6/2013 |
| JP | H10162868 | 6/1998 |
| RU | 2298044 C2 | 4/2007 |
| RU | 2302059 C1 | 6/2007 |
| TW | 391986 | 6/2000 |
| TW | 200937702 | 9/2009 |
| WF | WO0121846 A1 | 3/2001 |
| WO | WO03025235 A1 | 3/2003 |
| WO | WO2005007904 A1 | 1/2005 |
| WO | WO2008047956 A1 | 4/2008 |
| WO | 2008056125 A1 | 5/2008 |
| WO | 2008087684 A1 | 7/2008 |
| WO | WO2011138996 A1 | 11/2011 |

OTHER PUBLICATIONS

International Search Report and Written Opinion for PCT Application No. PCT/US2015/034758 mailed Dec. 23, 2015.
International Search Report and Written Opinion for PCT Application No. PCT/US2015/034694 mailed Dec. 23, 2015.
International Search Report and Written Opinion for PCT Application No. PCT/US2015/034761 mailed Dec. 23, 2015.
International Search Report and Written Opinion for PCT Application No. PCT/US2015/034717 mailed Dec. 23, 2015.

(56) References Cited

OTHER PUBLICATIONS

Zhu, Xinfeng; Leaching of Spent Lead Acid Battery Paste Components by Sodium Citrate and Acetic Acid; Journal of Hazardous Materials, Feb. 19, 2013; pp. 387-396.

* cited by examiner

SYSTEMS AND METHODS FOR PURIFYING AND RECYCLING LEAD FROM SPENT LEAD-ACID BATTERIES

CROSS-REFERENCE

This application claims priority from and the benefit of U.S. Provisional Application Ser. No. 62/015,045, entitled "METHODS FOR PURIFYING AND RECYCLING LEAD FROM SPENT LEAD-ACID BATTERIES", filed Jun. 20, 2014, U.S. Provisional Application Ser. No. 62/015,042, entitled "SYSTEMS AND METHODS FOR PURIFYING AND RECYCLING LEAD FROM SPENT LEAD-ACID BATTERIES", filed Jun. 20, 2014, U.S. Provisional Application Ser. No. 62/015,058, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jun. 20, 2014, U.S. Provisional Application Ser. No. 62/015,070, entitled "SYSTEMS AND METHODS FOR SEPARATING A PARTICULATE PRODUCT FROM PARTICULATE WASTE WHEN RECYCLING LEAD FROM SPENT LEAD-ACID BATTERIES", filed Jun. 20, 2014, which are hereby incorporated by reference for all purposes.

BACKGROUND

The present disclosure relates generally to systems and methods for recycling spent lead-acid batteries, and more specifically, relates to purifying and recycling the lead content of lead-acid batteries.

The lead used in the manufacture of the active material of new lead-acid batteries is typically in the form of lead oxide (PbO) that is typically produced by oxidizing a lead source having a high purity (e.g., 99.95% Pb). Lead oxide of high-purity is generally desirable when manufacturing lead-acid batteries since certain impurities (e.g., antimony, barium sulfate, tin) may enable side-reactions that can significantly affect battery cell performance. While it may be desirable to attempt to recover lead from the waste of spent or retired lead-acid batteries, this material may include a variety of lead compounds (lead alloys, oxides, sulfates and carbonates) and an array of physical and/or chemical impurities. Existing methods for purifying lead typically rely almost entirely on multi-stage pyrometallurgical smelting in which some these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process.

SUMMARY

The present disclosure relates to systems and methods by which lead from spent lead-acid batteries may be extracted, purified, and used in the production of new lead-acid batteries. In an embodiment, a system includes a lead salt precipitation device configured to: receive and mix a carboxylate source and a lead-bearing material to form a first mixture including a first lead salt precipitate, and output the first mixture. The system includes a basification device configured to: receive the first mixture from the lead salt precipitation device, increase the pH of the first mixture above 7 to dissolve the first lead salt precipitate and form a second mixture, and output the second mixture. The system includes a first phase separation device configured to: receive the second mixture from the basification device, isolate a liquid component of the second mixture from one or more insoluble components of the second mixture, and output the liquid component. The system also includes an acidification device configured to: receive the liquid component, decrease the pH of the liquid component below 7 to form a third mixture including a second lead salt precipitate, and output the third mixture. The system further includes a second phase separation device configured to: receive the third mixture, isolate the second lead salt from the third mixture, and output the second lead salt precipitate.

In another embodiment, a system includes a basic lead stream digestion device configured to: receive and mix a hydroxide and a lead-bearing material to form a first mixture, and output the first mixture. The system includes a first phase separation device configured to: receive the first mixture from the basic lead stream digestion device, isolate a liquid component from one or more insoluble components of the first mixture, and output the liquid component. The system also includes a lead salt precipitation device configured to: receive and mix the liquid component and a carboxylate source to form a second mixture including a lead salt precipitate, and output the second mixture. The system further includes a second phase separation device configured to: receive the second mixture from the lead salt precipitation device, isolate the liquid component from the lead salt precipitate of the second mixture, and output the lead salt precipitate.

In another embodiment, a system includes a continuous calcination device capable of: continuously receiving a supply of lead salt; continuously mixing the received lead salt with a gaseous stream at a temperature less than approximately 450° C. to yield leady oxide particles; and continuously outputting the leady oxide particles.

DRAWINGS

DETAILED DESCRIPTION

Figure 1:
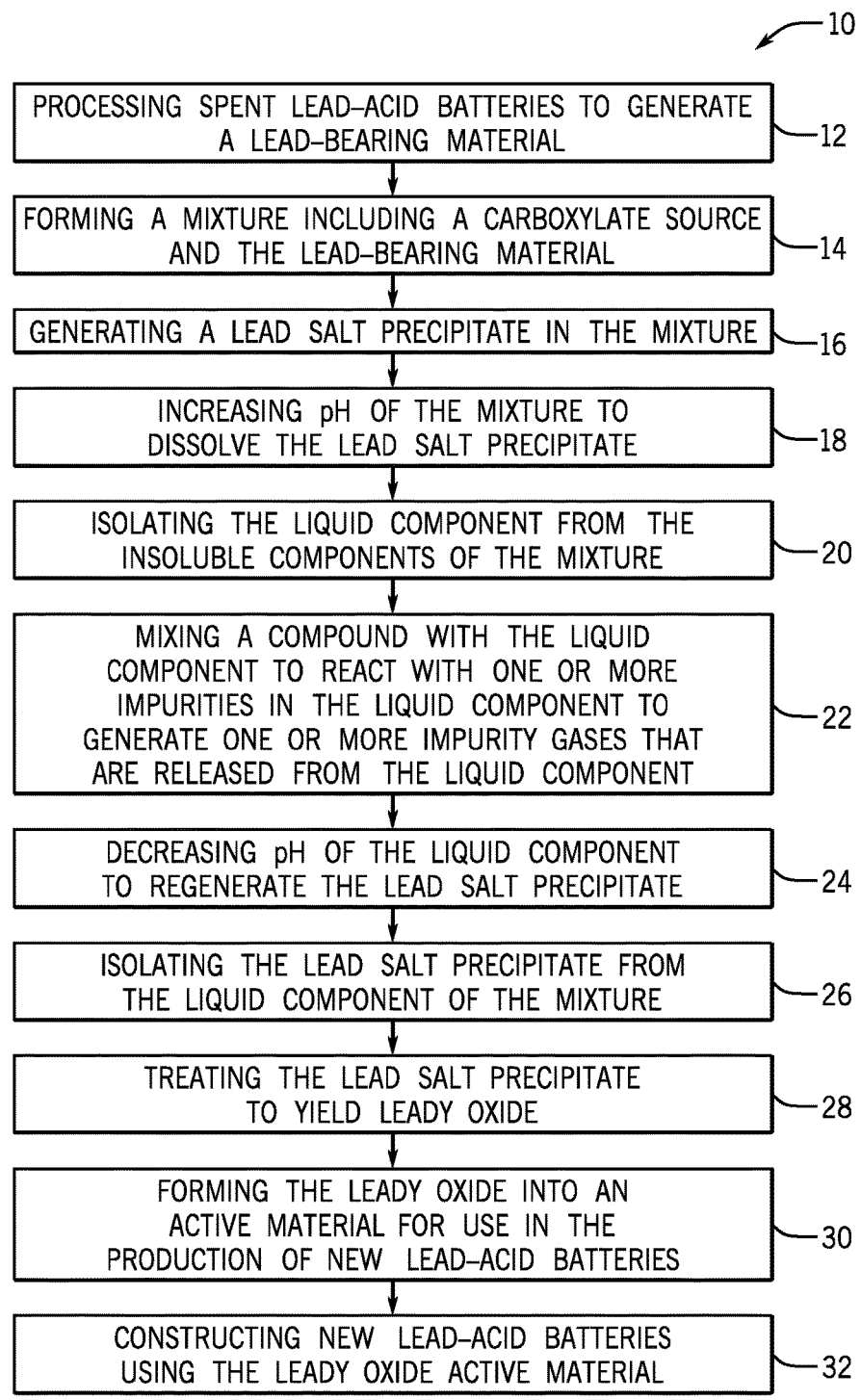
FIG. 1 is a flow diagram illustrating an embodiment of a process by which lead from spent lead-acid batteries may be extracted, purified, and used in the construction of new lead-acid batteries.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the disclosure of a particular component being made of or including a particular element called out by name (e.g., lead), should be interpreted to encompass all forms of lead (e.g., metallic lead, lead compounds, or mixtures thereof). For distinction, as used herein, the disclosure of a metallic form of an element may be indicated by the chemical formula (e.g., Pb(0)) or using the terms elemental, metallic, or free (e.g., elemental lead, metallic lead, or free lead). As used herein, "leady oxide" may be used to indicate a mixture of metallic lead (e.g., Pb(0)) and lead oxide (e.g., PbO) in various ratios as described. As used herein, the term "substantially free" may be used to indicate that the identified component is not present at all, or is only present in a trace amount (e.g., less than 0.1%, less than 0.01%, or less than 0.001%). As used herein, "an element or compound of Group X" may refer to any chemical substance (e.g., element or compound) that includes an element from the identified column of the periodic table. For example, "an element or compound of Group 14" may include any of the elements from Group 14 (e.g., carbon, silicon, tin, etc.) as well as any compounds that include Group 14 elements (e.g., carbonates, silicates, stannates, etc.). As used herein, a "carboxylate source" is any molecule or polymer that includes at least one carboxylate or carboxylic acid moiety or functionality. Accordingly, a non-limited list of example carboxylate sources include: citric acid, acetic acid, formic acid, citrate, acetate, formate, dilactate, oxalate, tartarate, or any combination thereof. The term "citrate" herein refers to citric acid, or a citrate salt of a Group 1 or Group 2 metal, or ammonium citrate. The term "acetate" herein refers to acetic acid, or acetate salts of a Group 1 or Group 2 metal, or ammonium acetate. "New lead-acid battery" herein refers to a newly produced lead acid battery, while the term "spent lead-acid battery," indicates a battery at the end of its useable service life. As used herein, an "antisolvent" is a solvent that may be added to a solution to facilitate the precipitation of a dissolved component (e.g., a lead salt). As used herein "peroxide" refers to hydrogen peroxide and/or any organic peroxide (e.g. peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof.

As mentioned above, existing methods typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion byproducts (e.g., $SO_2$, soot) may be restricted by local environmental regulations, present embodiments are directed toward enabling an aqueous solution-based removal of several impurities from the recovered lead, thereby avoiding or reducing the formation of such combustion byproducts and/or the cost associated with scrubbing them from the exhaust stream. Additionally, present embodiments address limitations of other waste lead purification techniques, enabling a robust technique for purifying and recycling of recovered lead on an industrial scale. That is, the presently disclosed technique is robust such that entire spent lead-acid batteries may be processed (e.g., broken apart, ground, or milled) and supplied as input, and, from this assorted mixture, the disclosed processes enable the formation of pure leady oxide for use in new lead-acid batteries. Accordingly, present embodiments enable a lead purification technique that is robust to the presence of a wide variety of impurities and provides enhanced control over the parameters of the purification process, while obviating or limiting reliance on conventional smelting and refining steps for purification and limiting the combustion of impurities. The methods described herein obviate the need for the production of highly refined metallic lead >99.95% as a precursor to lead oxide production.

FIG. 1 is a flow diagram illustrating an embodiment of a process 10 by which lead from spent lead-acid batteries may be extracted, purified, and used in the production of new lead-acid batteries. As illustrated in FIG. 1, the process 10 begins with processing (block 12) of spent lead-acid batteries (e.g., battery breaking) to generate a lead-bearing material. For example, in an embodiment, one or more lead-acid batteries may be fed through a hammer mill or another suitable device that is capable of crushing, pulverizing, grinding or otherwise physically breaking apart the entirety of the spent lead-acid battery. The components of the spent lead-acid battery may include, for example, metal posts, metal connectors, metal grids, carbon black, glass, a plastic or metal casing, plastic separators, plastic fibers, battery paste (e.g., including various lead oxides, lead sulfates and lead carbonates), and sulfuric acid, among other components. After being substantially pulverized, the resulting battery waste may, in certain embodiments, be passed through one or more preliminary purification steps in which certain components (e.g., the crushed plastic components)

may be removed from the remainder of the lead-bearing material, for example, using a separation device that takes advantage of the lower density of these plastic components. Further, in certain embodiments, some, or all, of the residual sulfuric acid entrained in the lead-bearing material may be recycled for reuse, or neutralized and crystallized as a solid sulfate for disposal or resale. In certain embodiments, pretreatment of the lead-bearing material may include a full or partial desulfurization stage in which the sulfate content of the lead-bearing material may be reduced by chemical means, for example, by treatment with a hydroxide (e.g., NaOH) or carbonate (e.g., soda ash).

The illustrated method 10 continues with forming (block 14) a mixture that includes a carboxylate source and the lead-bearing material. For example, to the lead-bearing material from block 12, a sodium citrate solution may be added to form such a mixture. In certain embodiments, water, and/or a hydroxide, and/or a peroxide, and/or acetic acid may be added as well. In certain embodiments, the carboxylic source may be metal citrate (e.g., sodium citrate), ammonium citrate, citric acid, metal acetate (e.g., sodium acetate), ammonium acetate, acetic acid, a combination thereof, or any other suitable carboxylic source that may drive the formation of lead salts in the leaching mixture. In certain embodiments, this leaching step may be performed in a reactor, such as a continuously stirred leaching tank, and may be performed at low (acidic) pH (e.g., pH between 1 and 7) and at slightly elevated temperatures (e.g., approximately 30-100° C.). The resulting mixture includes both soluble and insoluble residuals from the spent and pulverized batteries. Additionally, the carboxylic source in the mixture reacts with one or more forms of lead in the mixture (e.g., metallic lead, lead sulfate, lead carbonate, and lead oxide), with or without the assistance of the peroxide and/or an acetate that may be present in the mixture, to yield a lead salt (e.g., lead citrate, lead acetate). Since the lead salt may have limited solubility in the mixture at these low pH levels, a lead salt precipitate (e.g., a lead citrate precipitate, a lead acetate precipitate) may be generated (block 16) in the mixture as a result.

However, as mentioned above, the lead salt precipitate present in the mixture is also interspersed with residual insoluble components from the crushed batteries. As such, continuing through the method 10, the pH of the mixture may be increased (block 18) to dissolve the lead salt precipitate into the liquid component of the mixture. For example, in certain embodiments, the pH of the mixture may be increased above approximately 7, above approximately 8, between approximately 8 and approximately 14, or between approximately 8 and 12. In certain embodiments, this pH increase may be affected through the addition of base (e.g., hydroxide). In certain embodiments, the hydroxide may be added slowly or all at once. Further, in certain embodiments, the pH increase of block 18 may occur in a separate reaction vessel or reaction stage from the steps of the preceding blocks.

Accordingly, once the lead salt precipitate has been dissolved in the mixture, the liquid component of the mixture may be isolated (block 20) from the insoluble components of the mixture. For example, these insoluble components may include: barium sulfate, carbon black, glass, polymer, or a combination thereof. Additionally, the insoluble components may include residual metallic lead pieces from solid battery parts (terminals, connectors, grids), composed of a lead alloy that may include lead, antimony, arsenic, selenium, calcium, tin, or a combination thereof. In certain embodiments, these residual insoluble battery components may be filtered out or otherwise isolated from the liquid component of the mixture. Further, one or more of these insoluble components may be subsequently fed into other lead purification systems and/or techniques in accordance with embodiments of the present disclosure.

Subsequently, the liquid component isolated in block 20 may, in certain embodiments, undergo an additional purification step before the lead salt is precipitated and isolated. It should be noted that, for consistency, the term "liquid component" is used throughout subsequent steps to describe the liquid component initially isolated in block 20, even when this liquid is not part of a mixture (e.g., no solids present) and even as the liquid is modified throughout subsequent steps discussed below. With this in mind, the liquid component isolated in block 20 may be mixed (block 22) with a compound that reacts with one or more soluble impurities present in the liquid component to generate one or more impurity gases, which are then released from the liquid component. In general, the reactant is a reducing agent, such as a hydride source (e.g., sodium tetraborohydride, sodium hydride, hydrogen gas, or syngas), that is capable of reacting with one or more soluble impurities in the liquid component to generate relatively volatile impurity gases that are subsequently vented from the liquid component. In general, the impurities in the liquid component may include: an element or compound of Group 14 (e.g., carbonates, silicates, germanium salts, and/or tin salts), an element or compound of Group 15 (e.g., phosphates, arsenic salts, antimony salts, and/or bismuth salts), an element or compound of Group 16 (e.g., sulfates, selenium salts, and/or tellurium salts), an element or compound of Group 17 (e.g., fluoride salts, chloride salts, bromide salts, and/or iodide salts), or a combination thereof. For example, the liquid component may include dissolved impurities that are chemical compounds (e.g., ionic salts and/or covalent molecules) of tellurium, antimony, tin, selenium, arsenic, germanium, silicon, phosphorus, sulfur, or any combination thereof. Accordingly, the reaction between these soluble impurities and the aforementioned reactant may yield: hydrogen telluride, antimony trihydride (stibine), tin tetrahydride (stannane), hydrogen selenide, arsenic trihydride (arsine), germanium tetrahydride (germane), silicon hydrides (silane), phosphine, hydrogen disulfide, or a combination thereof. These and possibly other impurity gases released from the liquid component may be subsequently passed to other purification techniques or systems in accordance with the present disclosure. As a result of the purification described in block 22, the liquid component is purified from some or all of the aforementioned soluble impurities, resulting in a liquid component that is substantially a lead salt solution (e.g., a lead citrate solution); however, some impurities (e.g., sodium sulfate) may still be present. In certain embodiments, the purification described in block 22 may be skipped and the isolated liquid component described in block 20 may directly advance to the next step (e.g., block 24) in the illustrated process 10. In certain embodiments, an alternative or additional step in the purification of liquid component of block 20 may include the use of fine pure lead powder for cementation of impurities on the surface of the lead particles, and then this solid lead may be removed by a second solid/liquid separation stage.

Figure 2:
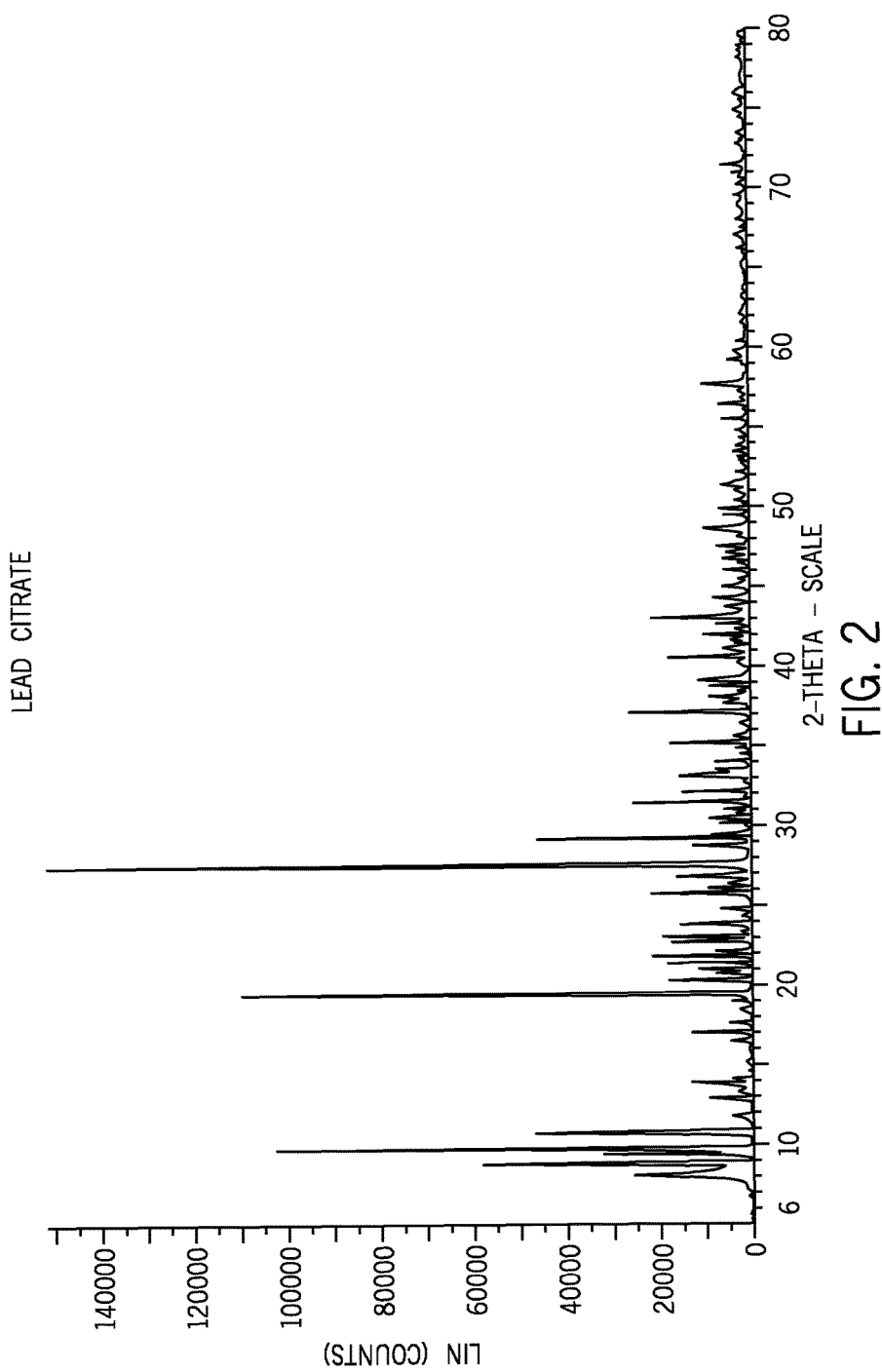
FIG. 2 is an X-ray diffraction (XRD) pattern of a lead citrate precipitate for an embodiment of the present approach.

Continuing through the process 10 illustrated in FIG. 1, the pH of the liquid component is decreased (block 24) in order to regenerate the lead salt precipitate. For example, an acid or buffer salt (e.g., citric acid, acetic acid, sodium citrate, sodium acetate, etc.) may be added to the liquid component to lower the pH to a value below 7 (e.g., between approximately 1 and approximately 6.5, or between approximately 3 and approximately 6) such that the solubility of the lead salt (e.g., lead citrate, lead acetate) in the liquid component is decreased, causing the lead salt to once again precipitate from the solution. Subsequently, this lead salt precipitate may be isolated (block 26) from the liquid component, for example, by filtration. After such a filtration, the lead salt precipitate may be washed with water, and the filtrate and wash water may retain all or most of the remaining impurities separated from the lead salt precipitate. For example, in certain embodiments, the isolated lead salt precipitate may include little or no residual sulfates (e.g., sodium sulfate and/or lead sulfate), such as less than 5% sulfates, less than 4% sulfates, less than 3% sulfates, less than 2% sulfates, less than 1% sulfates, less than 0.5% sulfates, less than 0.3% sulfates, or less than 0.1% sulfates. By specific example, FIG. 2 presents an X-ray diffraction pattern representative of a lead salt precipitate of the present approach in the form of a high purity lead citrate product. Further, it may be appreciated that the filtrate liquids (e.g., the liquid component and water washes) may be subsequently passed to other purification techniques in accordance with the present disclosure. Table 1, included below, provides chemical analysis data for an example input material (i.e., scrap battery paste, the lead-bearing material) and an example output material (i.e., a recovered lead citrate precipitate) as measured by ICP (inductively coupled plasma) spectrometry for an embodiment of the presently disclosed lead recovery method. Accordingly, Table 1 provides analytical data indicative of impurity levels in the lead bearing material and the recovered lead citrate salt for an embodiment of the present approach. From the values indicated in Table 1 it may be appreciated that, in certain embodiments, the recovered lead salt product (e.g., lead citrate) may be substantially free of impurities.

TABLE 1

Chemical analysis of scrap battery paste (i.e., the lead-bearing material) and an embodiment of the lead salt precipitate (i.e., lead citrate) using inductively coupled plasma (ICP) spectroscopy. Indicated values are in parts per million (ppm).

| Element | Scrap Battery Paste | Lead Citrate |
| --- | --- | --- |
| Silver (Ag) | 32 | 7 |
| Arsenic (As) | <1 | <1 |
| Barium (Ba) | 348 | 8 |
| Bismuth (Bi) | 90 | 7 |
| Calcium (Ca) | 189 | 11 |
| Cobalt (Co) | <1 | <1 |
| Chromium (Cr) | <1 | <1 |
| Copper (Cu) | 9 | 1 |
| Iron (Fe) | 20 | 3 |
| Manganese (Mn) | <1 | <1 |
| Nickel (Ni) | 2 | <1 |
| Platinum (Pt) | <1 | <1 |
| Sulfur (S) | 35734 | 229 |
| Antimony (Sb) | 285 | <1 |
| Selenium (Se) | <1 | <1 |
| Tin (Sn) | 626 | <1 |
| Strontium (Sr) | 4.9 | 0.5 |
| Tellurium (Te) | 1.7 | <0.3 |

Next in the process 10 illustrated in FIG. 1, the lead salt precipitate may be treated (block 28) to yield leady oxide. In certain embodiments, the lead salt precipitate may be treated using calcination. For example, during a calcination-based treatment, the lead salt precipitate may be heated to a temperature less than 450° C. (e.g., between approximately 275° C. and approximately 400° C., at approximately 330° C.), with or without presence of an additional oxidant (e.g., air, oxygen-enriched air, gas stream containing oxygen bearing compounds) or an oxygen reducer (e.g. methane, coke, propane, natural gas, etc.), with or without addition of dopants to promote the formation of a preferred lead oxide crystal structure or particle morphology, such that the organic portion (e.g., citrate, acetate) combusts, resulting in a mixture of free lead (i.e., Pb(0)) and lead oxide (i.e., PbO), generally referred to as leady oxide. Examples of process controls for such calcination treatments that may affect the resulting leady oxide include: the temperature of the calcination, time, droplet size, agglomerate size, residual moisture in the lead salt, the rate at which the lead salt is heated to the calcination temperature, introduction of a reducing substance, premixing with a second lead salt (e.g., lead formate, lead acetate) and/or introduction of additional inert gas (e.g., nitrogen). In other embodiments, the lead salt precipitate may instead be treated with base (e.g., a 25-50 wt % sodium hydroxide solution) and a hydroxylation/dehydration reaction between the base and the lead salt precipitate may yield the desired leady oxide product. It may be appreciated that different methods of treating the lead salt precipitate may provide different leady oxide properties (e.g., different crystal structures, different amounts of free lead, etc.). For example, treating the lead salt precipitate with base may result in a leady oxide product having little or no (e.g., approximately 0%) free lead. In certain embodiments, after removal of the solid leady oxide product from the basic solution, the basic solution may be subsequently treated to regenerate a carboxylate salt to be reused (e.g., in block 14) in the process 10. Optionally, the leady oxide may be further processed by washing, milling or grinding to obtain physical characteristics suitable for the intended use.

Figure 10:
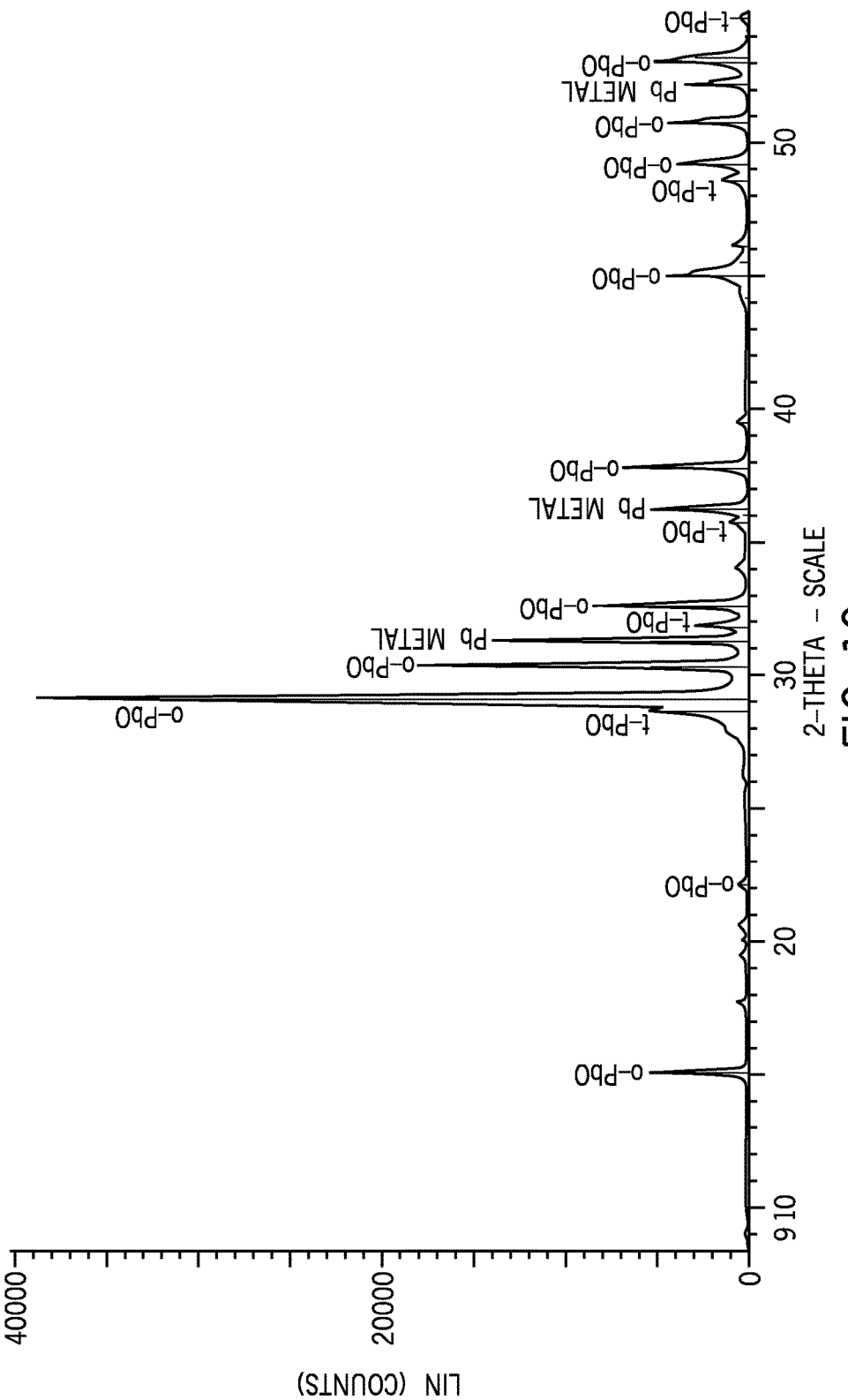
FIG. 10 is an X-ray diffraction (XRD) pattern of an embodiment of the leady oxide product formed via calcination of the recovered lead salt.
Figure 11:
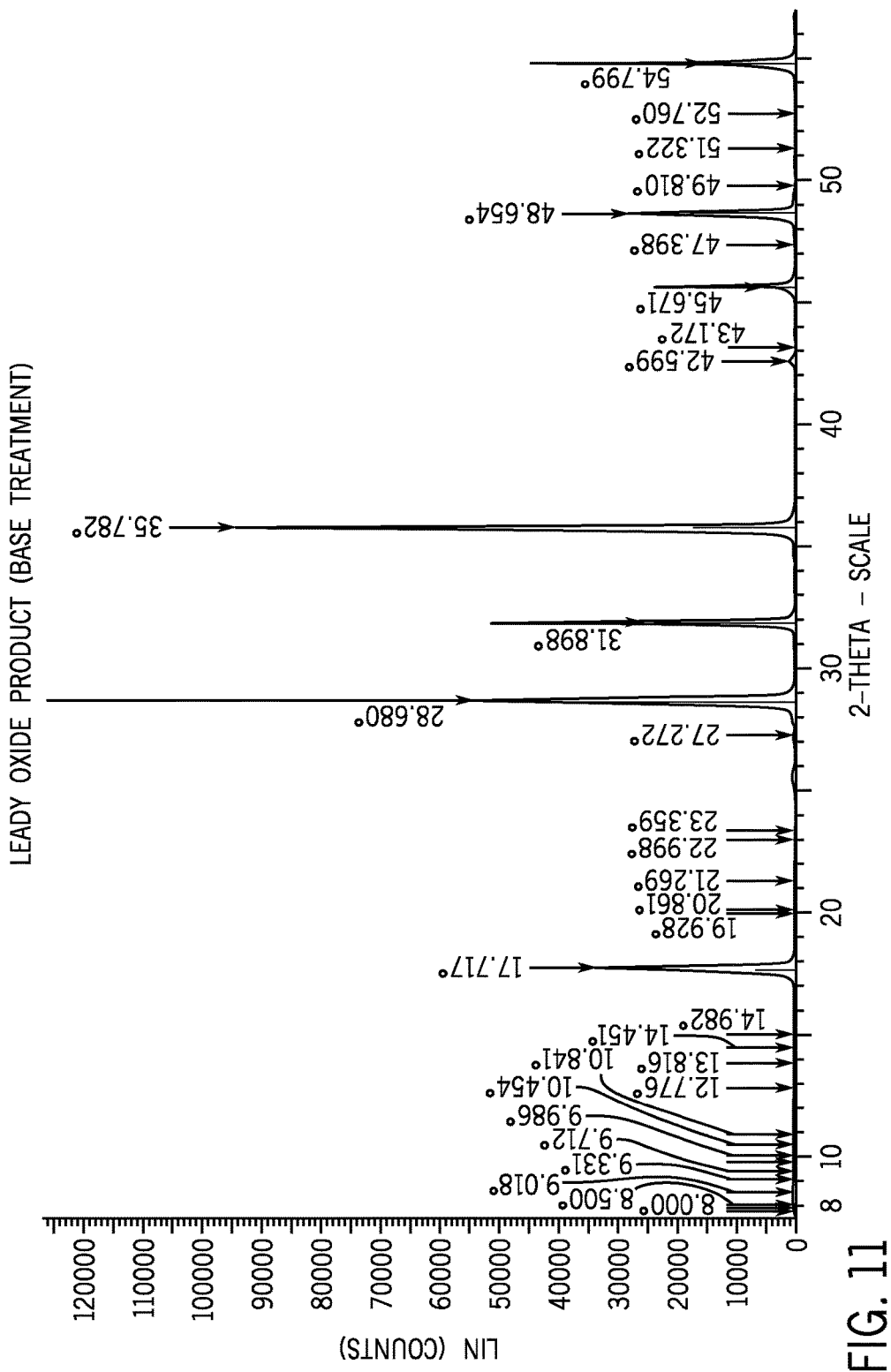
FIG. 11 is an X-ray diffraction (XRD) pattern of another embodiment of the lead oxide product formed via base treatment of the recovered lead salt.

Using the disclosed process 10, the generated leady oxide may include, for example, between approximately 0% and approximately 35%, between approximately 15% and approximately 30%, approximately 20%, or approximately 30% free lead. Additionally, in certain embodiments, the leady oxide particles may have a $D_{50}$ (i.e., an indication of average diameter, a diameter that is greater than the diameters of 50% of the synthesized leady oxide particles) between approximately 0.2 µm and approximately 4000 µm (e.g., between approximately 0.2 µm and approximately 1 µm, between approximately 0.2 µm and approximately 20 µm, between approximately 1 µm and 4000 µm). As such, it should be appreciated that the present approach may be useful for the synthesis of leady oxide nanoparticles that are 200 nm or more in diameter. Additionally, in certain embodiments, the leady oxide particles may have a Brunauer-Emmett-Teller (BET) surface area greater than approximately 1.0 square meters per gram ($m^2/g$) (e.g., greater than approximately 1.0 $m^2/g$, approximately 1.5 $m^2/g$, approximately 2.0 $m^2/g$, or approximately 2.5 $m^2/g$). Further, in certain embodiments, the leady oxide may have an acid absorption greater than approximately 100 milligrams (mg), 200 mg, or 300 mg $H_2SO_4$ per gram. In certain embodiments, the leady oxide may include less than approximately 20% beta phase lead oxide (β-PbO) (e.g., less than 1% β-PbO), while in other embodiments, the leady oxide may include greater than 80% β-PbO. FIG. 10 presents an X-ray diffraction pattern representative of a leady oxide product after a calcination treatment (in block 28), which demonstrates both PbO and Pb metal peaks. FIG. 11 presents an X-ray diffraction pattern representative of α-PbO lead oxide obtained by treatment of lead citrate with strong base (e.g., a 25-50 wt % solution of sodium hydroxide). As such, it may be appreciated that the leady oxide particles formed by the present approach may enable the production of lead-acid batteries having good to excellent electrical performance.

The process 10 illustrated in FIG. 1 continues with the leady oxide produced from the treatment of block 28 being formed (block 30) into a leady oxide active material for use in new lead-acid battery production. For example, the leady oxide may be mixed with water and sulfuric acid to form a battery paste that may be applied to a plurality of lead grids to serve as the active material of a lead-acid battery. Accordingly, a lead-acid battery may be constructed (block 32) using the leady oxide battery paste formed in block 30. As mentioned above, the leady oxide active material formed by the present approach may enable the production of lead-acid batteries having good to excellent electrical performance. The leady oxide formed in block 28 may also be used to manufacture tribasic lead sulfate (3BS), tetrabasic lead sulfate (4BS), and red lead (lead (II,IV) oxide, $Pb_3O_4$). In the case of 3BS and 4BS, the materials may be produced by mixing the leady oxide formed in block 28 with water and sulfuric acid in a heated stirred tank reactor. In the case of red lead, in certain embodiments, the material may be formed directly from the lead salt (e.g., lead citrate), or from the intermediate leady oxide of block 28, by calcination and oxidation at temperatures between 450 and 500° C., for example.

Figure 3:
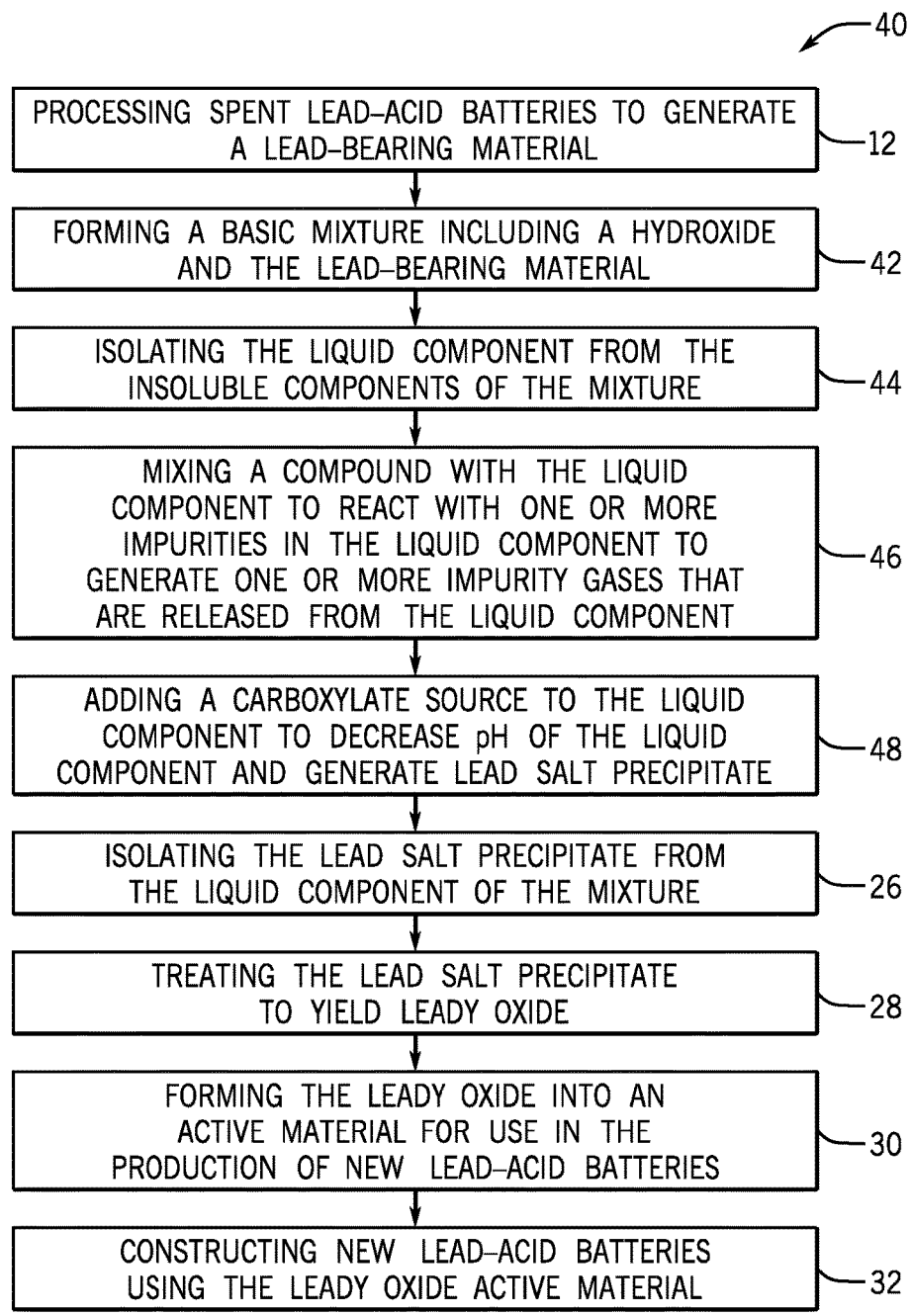
FIG. 3 is a flow diagram illustrating an embodiment of an alternative process by which lead from spent lead-acid batteries may be extracted, purified, and used in the construction of new lead-acid batteries.

FIG. 3 is a flow diagram illustrating an embodiment of a process 40 by which lead from spent lead-acid batteries may be extracted, purified, and used in the construction of a lead-acid battery. It may be appreciated that the process 40 illustrated in FIG. 3 is similar to the process 10 illustrated in FIG. 1; however, the process 40 illustrated in FIG. 3 includes fewer steps by delaying precipitation of the lead salt and, thereby, affording advantages in terms of efficiency. Like the process 10 illustrated in FIG. 1, the process 40 illustrated in FIG. 3 begins with processing (block 12) of spent lead-acid batteries to generate a lead-bearing material. As with block 12 of the process 10, this processing may include crushing and grinding the spent lead-acid batteries and one or more preliminary purification steps discussed in detail above. However, from there, the process 40 illustrated in FIG. 3 continues by forming (block 42) a basic mixture including a hydroxide and the lead-bearing material from block 12. For example, to the lead-bearing material from block 12, a base (e.g., hydroxide) may be added to form a basic mixture. In certain embodiments, water and/or peroxide may be added prior to the hydroxide component. In certain embodiments, this may be performed in a continuously stirred reactor, such as a leaching tank, at high pH (e.g., above 7, between 8 and 12) and slightly elevated temperatures (e.g., approximately 30 to 100° C.). The resulting mixture includes both soluble and insoluble residuals from the spent and pulverized lead-acid batteries. Additionally, the hydroxide in the mixture is capable of reacting with one or more forms of lead in the mixture (e.g., metallic lead, lead sulfate, lead carbonate, and lead oxide), with or without the assistance of a peroxide that may be present, to yield a soluble lead salt.

Next, the liquid component of the mixture from block 42 may be isolated (block 44) from the insoluble components of the mixture. As discussed with respect to block 20 in FIG. 1, these insoluble components may include: barium sulfate, carbon black, glass, polymer, metallic lead, lead alloys, or a combination thereof. These insoluble components may be filtered or otherwise isolated from the liquid component of the mixture. As discussed above, these insoluble components may be subsequently fed into other lead purification systems and/or techniques.

Subsequently, the liquid component isolated in block 44 may optionally undergo an additional purification like that described in block 22 of FIG. 1. That is, continuing through the process 40 illustrated in FIG. 3, the liquid component isolated in block 44 may be mixed (block 46) with a compound (e.g., a reducing agent, a hydride source such as sodium tetraborohydride, sodium hydride, hydrogen gas, or syngas) capable of reacting the one or more soluble impurities present in the isolated liquid component to generate one or more impurity gases, which are released and/or separated from the liquid component. Consequentially, the liquid component is purified from some or all of these soluble impurities, resulting in a liquid component that is substantially a lead hydroxide solution; however, some impurities (e.g., sodium sulfate) may still be present. In certain embodiments, block 46 may be skipped and the isolated liquid described in block 44 may directly advance to the next step (e.g., block 48) in the illustrated process 40.

Continuing through the process 40 illustrated in FIG. 3, a carboxylate source (e.g., citrate or acetate) may be added (block 48) to the liquid component to decrease the pH of the liquid and to generate a lead salt (e.g., lead citrate, lead acetate) precipitate. For example, a citrate (e.g., sodium citrate) may be added to the mixture to react with the lead compound in solution to form a lead citrate precipitate. Further, since the carboxylate source decreases the pH of the liquid below 8 (e.g., between approximately 2 and approximately 7), the solubility of the generated lead salt decreases, causing the lead salt to precipitate. As with the previously discussed method 10, the lead salt precipitate resulting from block 48 of the process 40 may be substantially pure and may include little or no sulfates (e.g., less than 5% sulfates, less than 4% sulfates, less than 3% sulfates, less than 2% sulfates, less than 1% sulfates, less than 0.5% sulfates, less than 0.3% sulfates, or less than 0.1% sulfates). After the lead salt precipitate is formed, the remainder of the process 40, including the steps of isolating the lead salt precipitate (block 26), treating the lead salt precipitate to form the leady oxide (block 28), forming the leady oxide into an active material (block 30), and constructing lead-acid batteries (block 32), are substantially the same as described above with respect to the method 10 illustrated in FIG. 1. As mentioned above with respect to the process 10, the leady oxide active material formed by the process 40 enables the production of new lead-acid batteries having good to excellent electrical performance.

Figure 4:
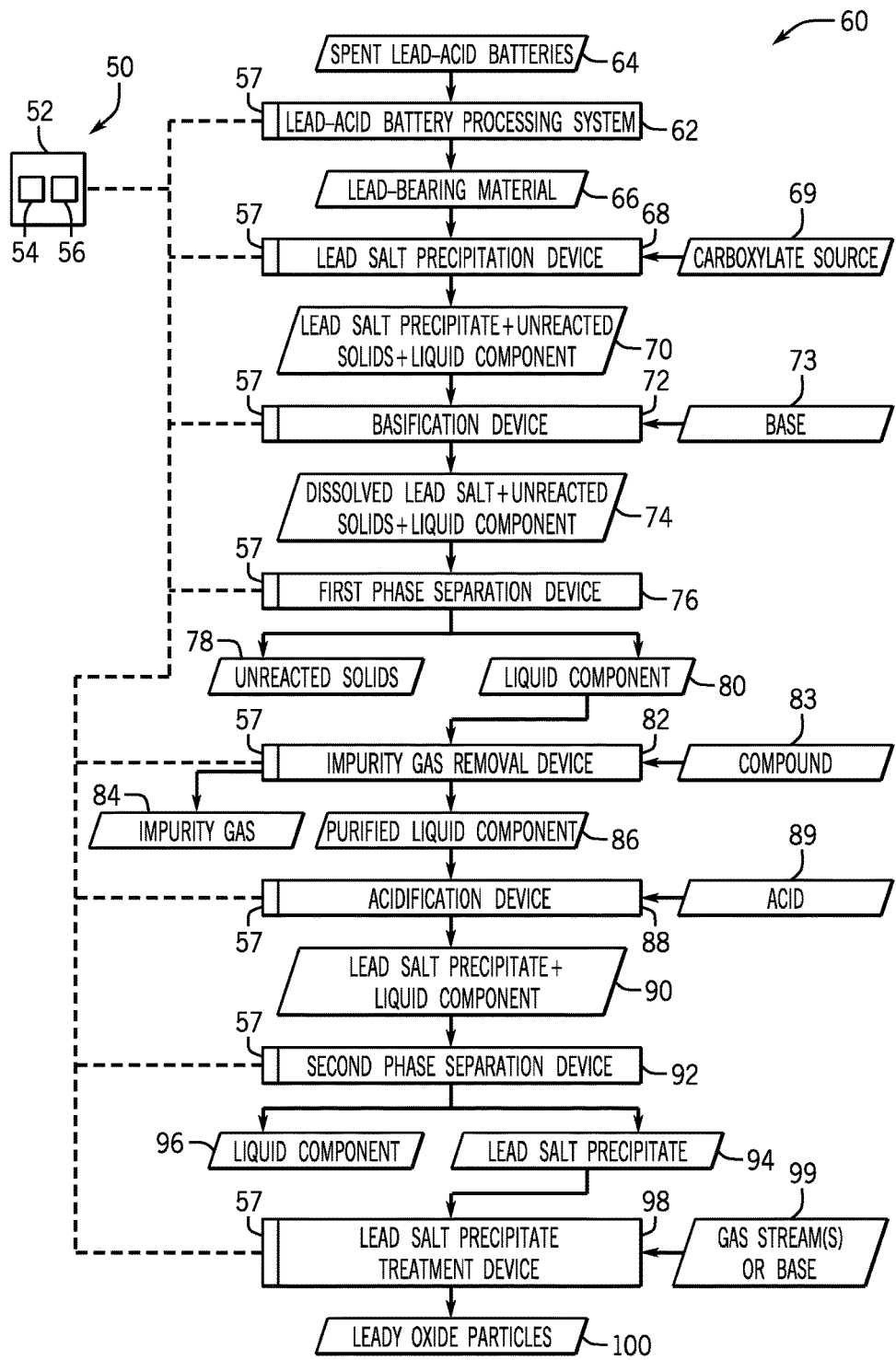
FIG. 4 is a schematic of an embodiment of a system for performing the process of FIG. 1.

FIG. 4 illustrates an embodiment of a system 60 configured to perform the process illustrated in FIG. 1 in what may be referred to as a continuous manner. In certain embodiments, some or all of the illustrated system 60 may be implemented as a multi-stage reactor system, or a series of individual reactors, that include phase separation devices disposed between certain stages or reactors in the system 60 to enable the continuous processing of spent lead-acid batteries into leady oxide. In addition to these devices, stages, and/or reactors (illustrated as rectangles) in the system 60, FIG. 4 also illustrates the various inputs and outputs (illustrated as parallelograms) for each device in the system 60. Further, the illustrated system 60 of FIG. 4 has a control system 50 that includes a controller 52 (e.g., a programmable logic controller (PLC)). The controller 52 includes a memory 54 and a processor 56, which enable the controller 52 to store and execute instructions (e.g., applications, modules, apps, firmware) to control operation of the system 60. For examples, the system 60 may include any number of sensing field devices 57 (e.g., temperature sensors, pressure sensors, flow rate sensors, oxygen sensors, rotational speed sensors, pH sensors) that are disposed throughout the system 60 and are communicatively coupled to the controller 52 (e.g., via a wired or wireless communication channel) to enable the controller 52 to determine the operational parameters of the system 60. Further, the controller 52 may be communicatively coupled to one or more control field devices 57 (e.g., actuators, valves, motors, pumps, screws, heating elements, compressors) configured to receive control signals from the controller 52 and modulate their operation or state accordingly.

With the foregoing in mind, the illustrated system 60 includes a lead-acid battery processing system 62 that receives spent lead-acid batteries 64 and generates a lead-bearing material 66. As such, the lead-acid battery processing system 62 performs the acts described by block 12 of the process 10 illustrated in FIG. 1. As mentioned above, this lead-acid battery processing system 62 may include a hammer mill or another suitable device that is capable of receiving entire lead-acid batteries (e.g., via a feed chute) and grinding the lead-acid batteries into pulverized battery materials. Additionally, as mentioned above, the lead-acid battery processing system 62 may include some preliminary purification features to remove one or more components from the pulverized battery materials. For example, in certain embodiments, the spent lead-acid battery processing system 62 may include a magnet, to remove iron and steel pieces, and/or a cyclone separation device may separate lower density spent battery components (e.g., plastic components from the housing of the lead-acid batteries) from the higher-density spent battery materials 66, which may subsequently be advanced to the next device (e.g., lead salt precipitation device 68) in the illustrated system 60.

The system 60 illustrated in FIG. 4 includes a lead salt precipitation device 68 that is configured to perform the acts described in blocks 14 and 16 of the process 10 illustrated in FIG. 1. The lead salt precipitation device 68 may be a reactor or one stage of a multi-stage reactor that receives the lead-bearing material 66 from the lead-acid battery processing system 62 and adds a carboxylate source 69 (e.g., citric acid, sodium citrate, acetic acid, sodium acetate, or a combination thereof) to the mixture 66. In certain embodiments, the lead salt precipitation device 68 may also add peroxide and/or hydroxide to the lead-bearing material 66. In certain embodiments, the lead salt precipitation device 68 may also be capable of both providing temperature control (e.g., heating and/or cooling) and agitation (e.g., mixing and/or stirring) of the mixture to facilitate formation of the lead salt precipitate. Accordingly, the lead salt precipitation device 68 may produce (e.g., store or contain) a mixture 70, which includes the newly formed lead salt precipitate and the remaining unreacted solids, both disposed within a liquid component. This mixture 70 may subsequently be advanced to the next device (e.g., basification device 72) in the illustrated system 60.

The illustrated system 60 includes a basification device 72 that is configured to perform the acts described in block 18 of the process 10 illustrated in FIG. 1. The basification device 72 may be a reactor or one stage of a multi-stage reactor that receives the mixture 70 from the lead salt precipitation device 68 and adds a base 73 (e.g., hydroxide) to basify the mixture 70 (e.g., to pH greater than approximately 7, between approximately 8 and approximately 14, or between approximately 8 and approximately 12) to dissolve the lead salt precipitate. In certain embodiments, the basification device 72 may also be capable of both providing temperature control (e.g., heating and/or cooling) and agitation (e.g., mixing and/or stirring) to facilitate dissolution of the lead salt precipitate into the liquid component of the mixture 70. Accordingly, the basification device 72 may produce (e.g., store or contain) a mixture 74 that includes the dissolved lead salt as well as other soluble and insoluble compounds originating from the spent battery. This mixture 74 may subsequently be advanced to the next device (e.g., phase separation device 76) in the illustrated system 60. Advancing mixture 74 to the next device can be accomplished in numerous ways. For example, in certain embodiments, basification device 72 may be equipped to allow an overflow of mostly or entirely liquid from the top of the basification device 72 and equipped with a screw conveyor or pump to remove insoluble components (e.g., slurry or sludge) from a cone-shaped bottom of the basification device 72.

The system 60 illustrated in FIG. 4 includes a first phase separation device 76 that is configured to perform the acts described in block 20 of the process 10 illustrated in FIG. 1. In certain embodiments, the first phase separation device 76 may include a filter press, a clarifier, a cyclone separator, a clarifier, a settling tank, or any other device capable of separating components of the mixture 74 based on solubility and/or density. As such, the first phase separation device 76 receives the mixture 74 and separates one or more unreacted solid components 78 from the liquid component 80 of the received mixture 74. In certain embodiments, like those described above, in which the liquid component of the mixture 74 (e.g., including little or no insoluble components 78) is advanced from the basification device 72 separately from the solid component (e.g., including mostly unreacted solids 78), the first phase separation device 76 may include multiple devices or operations (e.g., clarifiers with or without precipitation means, filter presses, drying belts, spray dryers, cyclonic separators, settling tanks, etc.) that separately process the liquid and slurry components of the mixture 74. As set forth above, these unreacted solids 78 may include, for example, barium sulfate, carbon black, glass, polymer, residual pieces of lead or lead alloys, grid metal, or a combination thereof, which may advance to other purification techniques or systems in accordance with the present disclosure. The isolated liquid component 80, which includes dissolved lead salt as well as other soluble impurities, may subsequently be advanced to the next device (e.g., impurity gas removal device 82) in the illustrated system 60.

The illustrated system 60 includes an impurity gas removal device 82 that is configured to perform the acts described in block 22 of the process 10 illustrated in FIG. 1. The impurity gas removal device 82 may be a reactor or a stage of a multi-stage reactor that receives the liquid component 80 isolated by the first phase separation device 76 and adds at least one compound 83 (e.g., a reducing agent) to the received liquid component 80. As set forth above, the compound 83 may be a reducing agent (e.g., a hydride source, sodium tetraborohydride, sodium hydride, hydrogen gas, or syngas), that is capable of reacting with one or more soluble impurities in the received liquid component 80 to generate one or more relatively volatile impurity gases 84 (e.g., hydrogen telluride, antimony trihydride (stibine), tin tetrahydride (stannane), hydrogen selenide, arsenic trihydride (arsine), germanium tetrahydride (germane), silicon hydrides (silane), phosphine, hydrogen disulfide, or a combination thereof) that are subsequently vented or released from the liquid component 80. In certain embodiments, the impurity gas removal device 82 may also be capable of both providing temperature control (e.g., heating and/or cooling), agitation (e.g., mixing and/or stirring), and/or reduced pressure (e.g. vacuum) to facilitate the formation and release of the impurity gases 84 from the liquid component 80. Additionally, the impurity gas removal device 82 may include one or more vent features or mechanisms that enable the impurity gases 84 to be removed from the device 82 and passed to other purification, storage, or disposal systems in accordance with the present disclosure. Accordingly, the impurity gas removal device 82 produces (e.g., stores or contains) a purified liquid component 86 that includes the dissolved lead salt and substantially less or fewer soluble other impurities. This purified liquid component 86 may subsequently be advanced to the next device (e.g., acidification device 88) in the illustrated system 60. It may be appreciated that, in certain embodiments, the impurity gas removal device 82 may not be present and the liquid component 80 isolated by the phase separation device 76 may proceed directly to the next device (e.g., acidification device 88) in the illustrated system 60.

The illustrated system 60 also includes an acidification device 88 that is configured to perform the acts described in block 24 of the process 10 illustrated in FIG. 1. The acidification device 88 may be a reactor or a stage of a multi-stage reactor that receives a liquid component (e.g., the purified liquid component 86 from the impurity gas removal device 82 or the liquid component 80 from the first phase separation device 76) and adds at least one acid 89 or buffer salt (e.g., citric acid, acetic acid, sodium citrate, sodium acetate, or a combination thereof) to the received liquid component. This acidifies the received liquid component 86 (e.g., to pH below approximately 7, between approximately 1 and approximately 6.5, between approximately 3 and 6) to drive the precipitation of the lead salt that is dissolved in the received liquid component. In certain embodiments, the acidification device 88 may also be capable of both providing temperature control (e.g., heating and/or cooling) and agitation (e.g., mixing and/or stirring) to facilitate the formation of the lead salt precipitate. Accordingly, the acidification device 88 may produce (e.g., store or contain) a mixture 90, which includes the lead salt precipitate and the remainder of the liquid component 86. This mixture 90 may subsequently advance to the next device (e.g., second phase separation device 92) in the illustrated system 60.

The system 60 illustrated in FIG. 4 includes a second phase separation device 92 that is configured to perform the acts described in block 26 of the process 10 illustrated in FIG. 1. In certain embodiments, the second phase separation device 92 may include a filter press, a clarifier, a cyclone separator, drying belts, spray dryers, a settling tank, or any other device capable of separating components of the mixture 90 based on solubility and/or density. As such, the second phase separation device 92 receives the mixture 90 and separates the lead salt precipitate 94 from a liquid component 96 of the received mixture 90. The isolated liquid component 96, which includes soluble lead compounds and other impurities, may subsequently be advanced to other purification techniques or systems in accordance with the present disclosure. Subsequently, the isolated lead salt precipitate 94 (e.g., lead citrate, lead acetate) may advance to the next device (e.g., lead salt precipitate treatment device 98) in the illustrated system 60 and eventually provide the leady oxide particles 100, as discussed below.

Figure 5:
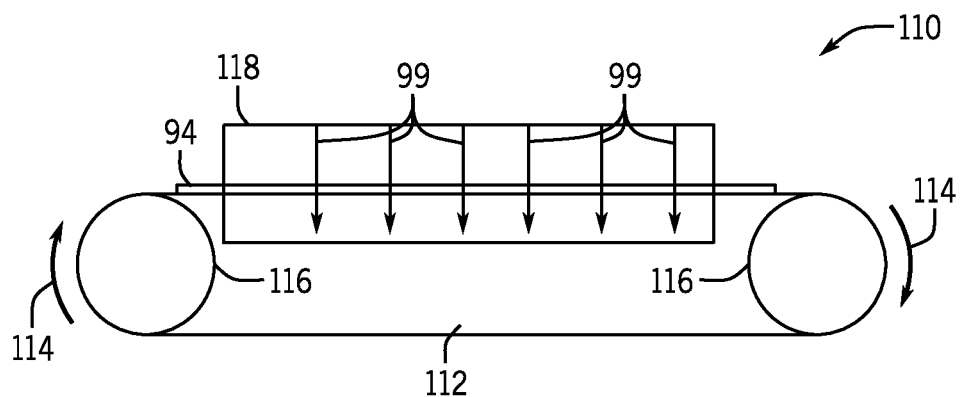
FIG. 5 is a schematic of a belt drying device, in accordance with embodiments of the present approach.

It maybe be appreciated that, in certain embodiments, the phase separation device 92 may perform some or all of the treatment step described in block 28 of the process 10 illustrated in FIG. 1. For example, in certain embodiments, the phase separation device 92 may be a belt dryer like the belt dryer 110 illustrated in FIG. 5. For example, the belt dryer 110 illustrated in FIG. 5 includes a belt 112 that is advanced through the motion 114 a plurality of rollers 116. Further, the belt 112 of the belt dryer 110 is configured to remove the lead salt precipitate 94 from the mixture 90, and then advance the extracted lead salt precipitate through one or more heating and drying units 118, wherein gas streams 99 (e.g., air, oxygen-enriched air, inert gas/air mixtures) are passed over the lead salt precipitate 94 to dry the solid. It may be appreciated that, if the gas stream 99 is sufficiently hot (e.g., between approximately 300° C. and approximately 400° C.), the lead salt precipitate 94 may be at least partially converted to leady oxide. It may be appreciated that this oxidation may be enhanced when the lead salt precipitate 94 is still wet or moist during heating. As such, in certain embodiments, such a belt dryer 110 (or a spray dryer, as discussed below) may serve as both the second phase separation device 92 and the lead salt precipitate treatment device 98 of the system 60. In other embodiments, a belt dryer 110 or spray dryer may serve as the second phase separation device 92, only partially converting the lead salt precipitate 94 into leady oxide, and a separate lead salt precipitate treatment device 98 may complete the process to form the leady oxide particles 100. In another embodiment, the belt dryer 110 or a spray dryer may serve to only partially dry the lead salt precipitate, purposely leaving behind some residual moisture to enhance or promote oxidation of the lead salt precipitate in certain lead salt precipitate treatment devices 98, as discussed below.

Figure 6:
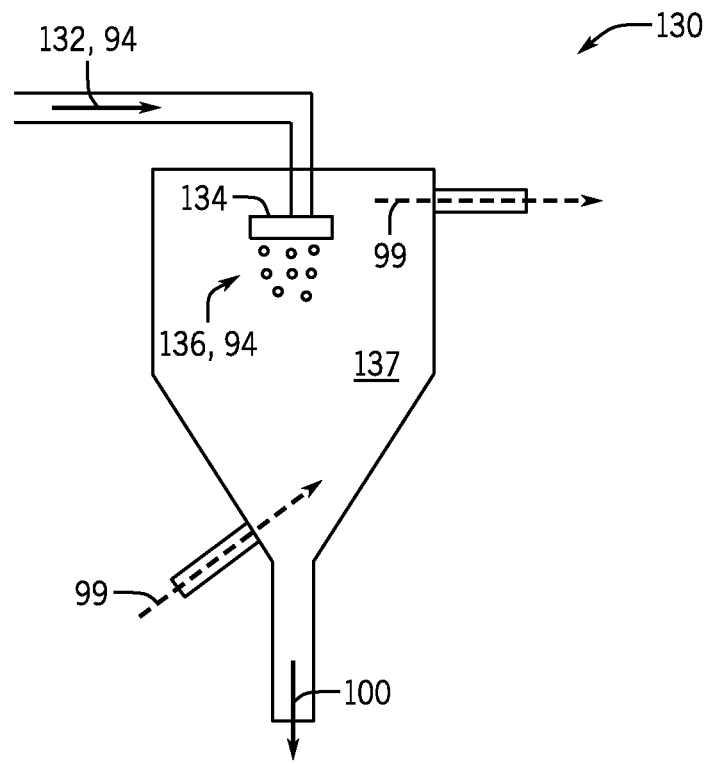
FIG. 6 is a schematic of a spray calcining device, in accordance with embodiments of the present approach.
Figure 7:
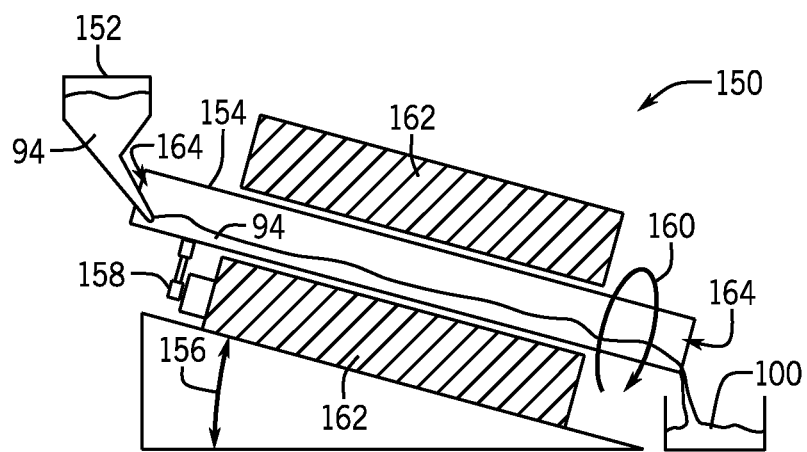
FIG. 7 is a schematic of a rotary kiln calcination device, in accordance with embodiments of the present approach.
Figure 8:
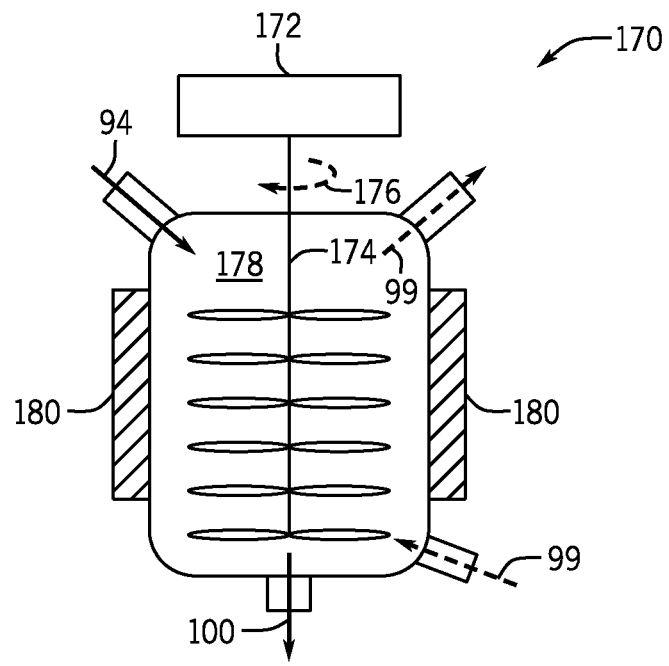
FIG. 8 is a schematic of a stirred pot reactor, in accordance with embodiments of the present approach.

The system 60 illustrated in FIG. 4 includes a lead salt precipitate treatment device 98 that is configured to perform the acts described in block 28 of the process 10 illustrated in FIG. 1. In certain embodiments, the lead salt precipitate treatment device 98 may include a belt dryer (as discussed above), a batch calciner (e.g., an oven), a spray calciner, a rotary kiln calciner, a spray pyrolysis reactor, a stirred pot reactor, or another suitable treatment system. As such, the lead salt precipitate treatment device 98 receives the lead salt precipitate 94 isolated by the second phase separation device 92 and reacts the lead salt precipitate 94 with or without one or more gas streams 99 (e.g., air, oxygen-enriched air, nitrogen/air mixtures, mixtures including an oxygen-reducing agent, including carbon-based materials such as methane, coke, propane, natural gas, etc.) or base (e.g., hydroxide, a 25-50 wt % sodium hydroxide solution) to form leady oxide particles 100, which may be used as-is, or after additional processing (milling), to form a leady oxide active material for the construction of new lead-acid batteries (e.g., as discussed in blocks 30 and 32 of the process 10 in FIG. 1). As mentioned above with respect to the process 10, the leady oxide produced by the illustrated system 60 enables the production of new lead-acid batteries having good to excellent electrical performance. FIGS. 6-8 below illustrate example embodiments of lead salt precipitate treatment devices 98 of FIG. 4 that operate based on a number of controllable parameters that may be used to affect the nature (e.g., size, shape, composition, surface area, reactivity) of the leady oxide particles 100 produced by the system 60.

FIG. 6 illustrates an embodiment of a spray calciner device 130 that may, in certain embodiments, serve as the lead salt precipitate treatment device 98 of FIG. 4. The spray calciner system 130 illustrated in FIG. 6 receives a flow 132 of the lead salt precipitate 94 (e.g., slurry form, partially wet or completely dried) isolated by the second phase separation device 92. This lead salt precipitate 94 is passed through an atomizer 134 (e.g., an ultrasonic or physical atomizer) that separates or atomizes the lead salt precipitate 94 into fine droplets or particles 136 within a calcination chamber 137. A hot gas stream 99 (e.g., air, oxygen-enriched air, inert gas/air/reducing mixtures) may then mix with the atomized lead salt particles 136 throughout the calcination chamber 137, which may convert the atomized lead salt particles 136 into leady oxide particles 100. After oxidizing the lead salt particles 136, the gas stream 99 may exit the calcination chamber 137, removing residual moisture, water of crystallization, carbon monoxide, carbon dioxide from the calcination chamber 137 in the process. The leady oxide product 100 may flow from the bottom of the calcination chamber 137, and may advance through subsequent separation steps. It may be appreciated that the spray calciner device 130 illustrated in FIG. 6 may enable greater control over the size (e.g., nanoparticles or microparticles), shape (e.g., spherical, elongated, hollow spheres, cracked shells), composition (e.g., amount of free lead per particle, thickness of an outer lead oxide shell relative to the diameter of an inner free lead core), surface area, reactivity, and so forth, by controlling the parameters (e.g., flow rate of the lead salt 132, flow rate of the gas stream 99, temperature of the gas stream 99, composition of the gas stream 99, dimensions of the calcination chamber 137, internal construction to control turbulence inside the calcinations chamber 137, size of the fine lead salt particles 136 formed by the atomizer 134) of the spray calciner device 130. In certain embodiments, the spray calcining operation may be divided into two steps in which the lead salt is first reduced into metallic lead particles in a first chamber, then these metallic lead particles are partially oxidized in a second chamber, forming a leady oxide particle having a closed or partially opened (e.g., cracked) lead oxide shell around a metallic lead core. In another embodiment the system 130 may be used to pre-treat the lead salt precipitate 94 to remove some or all of the entrained water, water of crystallization, carbon monoxide, carbon dioxide, to produce a partially pyrolysed carbon/lead mix then can be fed back into any of the alternate treatment methods or devices described herein (e.g., devices 110, 130, 150, 170), substituting for the lead salt precipitate feed 94, to ultimately yield the leady oxide particles 100. It may also be appreciated that, in certain embodiments, the separation of the liquid component 96 from the lead salt precipitate 94 by second phase separation device 92, as illustrated in FIG. 4, may be implemented using a spray dryer that is substantially the same as the spray calciner device 130 of FIG. 6 in structure; although the conditions within the spray dryer may be somewhat different (e.g., lower temperature, different gas mixtures, etc.) relative to calcination conditions discussed above. Indeed, like the belt dryer 110 illustrated in FIG. 5 and discussed above, in certain embodiments, a spray dryer/calciner device like the spray calciner device 130 illustrated in FIG. 6 may serve the roles as both the second phase separation device 98 and the lead salt precipitate treatment device 98.

FIG. 7 illustrates an embodiment of a rotary kiln calciner device 150 that may, in certain embodiments, serve as the lead salt precipitate treatment device 98 of FIG. 4. The rotary kiln calciner device 150 illustrated in FIG. 7 includes a feed hopper 152 that receives a supply of lead salt precipitate 94 (e.g., partially wet or completely dried) isolated by the second phase separation device 92. The feed hopper 152 feeds a supply of the lead salt precipitate 94 into a tube furnace 154 that is tilted (e.g., declined) at an adjustable angle 156. Further, the tube furnace 154 is coupled to a drive system 158 that enables the tube furnace 154 to rotate (as illustrated by the arrow 160) to facilitate the movement of the lead salt precipitate 94 through the length of the tube furnace 154 and uniformly heat the lead salt precipitate 94 into leady oxide particles 100, which exit the bottom of the tube furnace 154. In certain embodiments, the tube furnace 154 may have a variable internal geometry (e.g., a cone shape, fins, ledges, recesses) and/or additional features (e.g., chains or lifters) which may promote movement of the lead salt precipitate 94 within and through the length of the tube furnace 154. In certain embodiments, a gas stream 164 (e.g., an air flow, an oxygen-enriched air flow, an oxygen-reduced air flow, a flow of an inert gas/air/reducing gas mixture) may be passed through the tube furnace 154, in either the co-current or counter-current direction, to facilitate oxidation of the lead salt precipitate 94 into the leady oxide particles 100. It may be appreciated that the rotary kiln calciner device 150 illustrated in FIG. 7 may enable greater control over the size (e.g., nanoparticles, microparticles), shape (e.g., spherical, elongated, shells, hollow spherical), composition (e.g., amount of free lead per particle, thickness of an outer lead oxide shell relative to the diameter of an inner free lead core), surface area, reactivity, and so forth, by controlling the parameters (e.g., flow rate of the lead salt 94 from the feed hopper 152, diameter of the tube furnace 154, length of the tube furnace 154, internal geometry of the tube furnace 154, temperature of the heating elements 162, tilt angle 156, rotational rate 160, flow direction and/or composition of the atmosphere or gas stream 164 in the tube furnace 154) of the rotary kiln calciner device 150.

FIG. 8 illustrates an embodiment of a stirred pot reactor device 170 that may, in certain embodiments, serve as the lead salt precipitate treatment device 98 of FIG. 4. The stirred pot reactor device 170 includes a drive system 172 that drives a mechanical stirrer 174 to rotate to facilitate mixing within the interior 178 of the stirred pot reactor device 170. In certain embodiments, the stirred pot reactor device 170 also includes heating elements 180 to facilitate heating of the interior 178 of the reactor 170. During operation, the stirred pot reactor device 170 illustrated in FIG. 7 receives a supply of lead salt precipitate 94 (e.g., partially wet or completely dried) isolated by the second phase separation device 92 of FIG. 4. This lead salt precipitate 94 may be introduced into the interior 178 of the reactor, wherein the lead salt precipitate 94 may be mixed with a gas stream 99 (e.g., an air flow, an oxygen-enriched air flow, an oxygen-depleted air flow, a flow of an inert gas/air mixture) that traverses the interior 178 of the reactor 170. The lead salt precipitate 94 and the gas stream 99 may be thoroughly mixed via the motion of the gas stream 99 as well as the rotation 176 of the mechanical stirrer 174, until the lead salt precipitate 94 is oxidized into leady oxide particles 100, which may be removed from the stirred pot reactor device 170. It may be appreciated that the stirred pot reactor device 170 illustrated in FIG. 8 may enable control over the size (e.g., nanoparticles, microparticles), shape (e.g., spherical, elongated, shells, hollow spherical), composition (e.g., amount of free lead per particle, thickness of an outer lead oxide shell relative to the diameter of an inner free lead core), surface area, reactivity, and so forth, by controlling the parameters (e.g., feed material rate of the lead salt 94 into the interior 178 of the reactor 170, dimensions of the interior 178 of the reactor 170, temperature of the heating elements 180, rate of the rotation 176, temperature of the gas stream 99, composition of the gas stream 99, flow rate of the gas stream 99) of the stirred pot reactor device 170.

Figure 9:
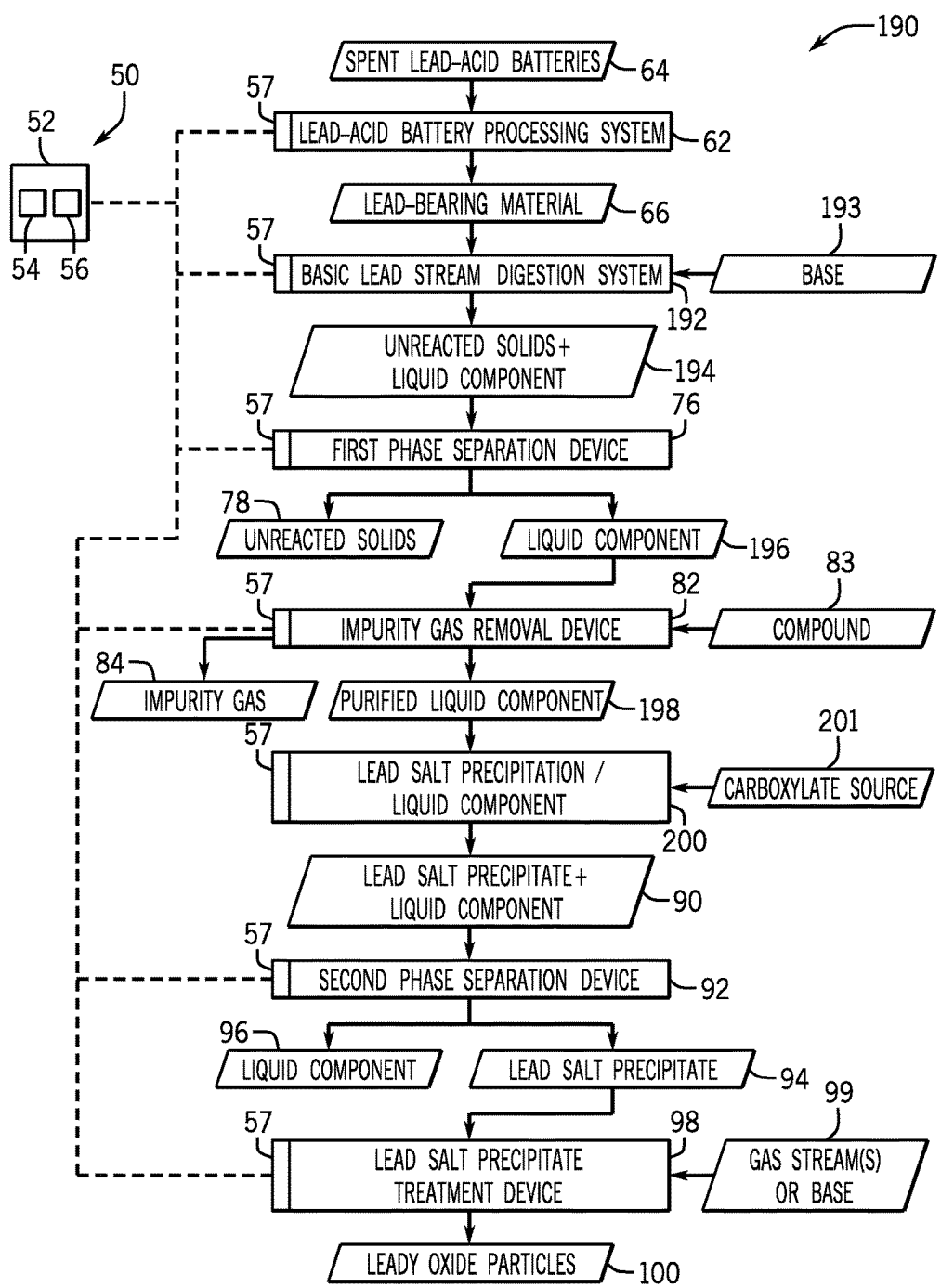
FIG. 9 is a schematic illustrating an embodiment of a system for performing the process of FIG. 3.

Similar to the system 60 illustrated in FIG. 4, FIG. 9 illustrates an embodiment of a system 190 configured to perform the process illustrated in FIG. 3 in what is referred to as a continuous manner. A number of the devices and components illustrated in FIG. 9 may be generally configured to operate as set forth above with respect to FIG. 4 and, therefore, may only be briefly mentioned below. With the foregoing in mind, the illustrated system 190 includes the previously described control system 50, which is communicatively coupled to the devices of the system 190 to monitor and control operation of the system 190 by means of measurement and control field devices 57. The illustrated system 190 also includes the lead-acid battery processing system 62 (discussed above), which receives spent lead-acid batteries 64 and generates a lead bearing mixture 66 that may subsequently be advanced to the next stage or reactor (e.g., the basic lead stream digestion system 192) in the illustrated system 190.

Unlike the system 60 of FIG. 4, the system 190 illustrated in FIG. 9 includes a basic lead stream digestion system 192 that is configured to perform the acts described in block 42 of the process 40 illustrated in FIG. 3. The basic lead stream digestion system 192 may be a reactor or a single stage of a multi-stage reactor that receives the lead-bearing material 66 from the lead-acid battery processing system 62 and adds base 193 (e.g., a hydroxide) to the lead-bearing material 66 to form a basic mixture 194 (e.g., pH greater than approximately 7, between approximately 8 and approximately 14, between approximately 8 and approximately 12) that includes unreacted solids dispersed within a liquid component. In certain embodiments, the basic lead stream digestion system 192 may also be capable of both providing temperature control (e.g., heating and/or cooling to temperatures between approximately 30° C. and 100° C.) and agitation (e.g., mixing and/or stirring) the mixture to facilitate the chemical digestion (e.g., reaction and/or dissolution, leaching) of one or more components in the received lead-bearing material 66. Accordingly, the basic mixture 194 produced by the basic lead stream digestion system 192, which includes dissolved lead compounds, unreacted solids, and soluble impurities, may subsequently be advanced to the next device (e.g., first phase separation device 76) in the illustrated system 190 of FIG. 9.

Accordingly, the system 190 illustrated in FIG. 9 includes the first phase separation device 76 (as discussed above), which may be configured to perform the acts described in block 44 of the process 40 illustrated in FIG. 3. The liquid component 196 isolated by the first phase separation device 76, which includes dissolved lead compound as well as soluble impurities, may subsequently be advanced to the next device (e.g., impurity gas removal device 82) in the illustrated system 190. In certain embodiments, the system 190 includes the impurity gas removal device 82 (discussed above) which may be configured to perform the acts described in block 46 of the process 40 illustrated in FIG. 3. That is, the impurity gas removal device 82 may react the received liquid component 196 with at least one compound 83 (e.g., a reducing agent, a hydride source, syngas) to generate one or more impurity gases 84. Accordingly, the impurity gas removal device 82 may produce a purified liquid component 198, which includes the dissolved lead compound and substantially less or fewer soluble impurities. This purified liquid component 198 may subsequently be advanced to the next device (e.g., lead salt precipitation/acidification device 200) in the illustrated system 190. It may be appreciated that, in certain embodiments, the impurity gas removal device 82 may not be present and the liquid component 196 isolated by the phase separation device 76 may proceed directly to the next device (e.g., lead salt precipitation/acidification device 200) in the illustrated system 190.

The illustrated system 190 also includes a lead salt precipitation/acidification device 200 that is configured to perform the acts described in block 48 of the process 40 illustrated in FIG. 3. The lead salt precipitation/acidification device 200 may be a reactor or a stage of a multi-stage reactor that receives a liquid component (e.g., the liquid component 198 from the impurity gas removal device 82 or the liquid component 196 isolated by the first phase separation device 76) and adds a carboxylate source 201 (e.g., citrate or acetate) to the received liquid component 196 or 198 to drive the formation and the precipitation of a lead salt (e.g., lead citrate, lead acetate) precipitate. In certain embodiments, the lead salt precipitation/acidification device 200 may instead add a carboxylate salt (e.g., a citrate or acetate) and an acid or buffer salt (e.g., acetic acid, citric acid, sodium acetate, sodium citrate, or a combination thereof) to the received liquid component to drive formation and precipitation of the lead salt. In certain embodiments, the lead salt precipitation/acidification device 200 may also be capable of both providing temperature control (e.g., heating and/or cooling) and agitation (e.g., mixing and/or stirring) to facilitate the formation of the lead salt precipitate. Subsequently, the lead salt precipitation/acidification device 200 may produce a mixture 90, as discussed above, which includes the lead salt precipitate 94 and the remainder of the liquid component 96. This mixture 90 may advance through subsequent devices (e.g., second phase separation device 92 and lead salt precipitate treatment device 98) in the illustrated system 190, operating as described above with respect to the system 60 of FIG. 4, to yield the leady oxide particles 100. As mentioned above with respect to the process 40, the leady oxide produced by the system 190 illustrated in FIG. 9 enables the production of new lead-acid batteries having good to excellent electrical performance.

One or more of the disclosed embodiments, alone or on combination, may provide one or more technical effects useful in the recycling of lead-acid batteries and/or in the recovery and purification of lead from other waste materials. Embodiments of the present approach enable the industrial scale extraction and purification of lead from spent lead-acid batteries. Further, present embodiments enable the removal of several impurities (e.g., insoluble impurities, sulfates, alloying metals) from the recovered lead, thereby avoiding or reducing the formation of certain undesired combustion byproducts as well as the cost associated with scrubbing these byproducts from an exhaust stream during lead recovery. Accordingly, present embodiments enable continuous lead purification techniques that are robust to the presence of a wide variety of impurities and provide enhanced control over the parameters of the purification process. In particular, present embodiments provide a number of controllable parameters that may be used to affect the nature (e.g., purity, size, shape, composition, surface area, crystal morphology, reactivity) of the produced leady oxide particles. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, pHs, temperatures, pressures, mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
a lead salt precipitation device configured to: receive and mix a carboxylate source and a lead-bearing material to form a first mixture comprising a first lead salt precipitate, and output the first mixture;
a basification device configured to: receive the first mixture from the lead salt precipitation device, increase the pH of the first mixture above 7 to dissolve the first lead salt precipitate and form a second mixture, and output the second mixture;
a first phase separation device configured to: receive the second mixture from the basification device, isolate a liquid component of the second mixture from one or more insoluble components of the second mixture, and output the liquid component;
an acidification device configured to: receive the liquid component, decrease the pH of the liquid component below 7 to form a third mixture comprising a second lead salt precipitate, and output the third mixture;
a second phase separation device configured to: receive the third mixture, isolate the second lead salt from the third mixture, and output the second lead salt precipitate; and
a lead salt precipitate treatment device comprising a rotary kiln calciner configured to: receive the second lead salt precipitate, introduce the second lead salt precipitate into a top of a rotating tube furnace of the rotary kiln calciner, treat the second lead salt precipitate by mixing the second lead salt precipitate with a gaseous oxidant stream to oxidize the second lead salt precipitate into leady oxide within the rotating tube furnace, and output the leady oxide at a bottom of the rotating tube furnace.

2. The system of claim 1, comprising a lead-acid battery processing device configured to: receive at least one lead-acid battery, grind the at least one lead-acid battery into the lead-bearing material, and output the lead-bearing material.

3. The system of claim 1, comprising an impurity gas removal device configured to: receive the liquid component from the first phase separation device, mix the liquid component with a compound that evolves one or more impurity gases from one or more impurities of the liquid component, and output the liquid component to the acidification device without the one or more impurities.

4. The system of claim 1, wherein the first or second phase separation device comprises a filter press, a clarifier, or a cyclone separator.

5. The system of claim 1, wherein the pH of the second mixture formed in the basification device is between 8 and 14.

6. The system of claim 1, wherein the second phase separation device comprises a belt dryer or spray dryer configured to: remove the second lead salt precipitate from the third mixture, and heat and dry the second lead salt precipitate.

7. The system of claim 6, wherein the belt dryer or spray dryer is further configured to at least partially oxidize the second lead salt precipitate into leady oxide while heating and drying the second lead salt precipitate.

8. The system of claim 1, wherein the leady oxide comprises between approximately 0% and approximately 35% free lead and less than approximately 20% beta phase lead oxide.

9. The system of claim 1, wherein the leady oxide comprises leady oxide particles having a $D_{50}$ between approximately 0.2 μm and approximately 20 μm.

10. The system of claim 1, wherein the leady oxide has a Brunauer-Emmett-Teller (BET) surface area greater than approximately 2.5 square meters per gram ($m^2$/g).

11. The system of claim 1, wherein the leady oxide has an acid absorption greater than approximately 250 milligrams $H_2SO_4$ per gram.

12. The system of claim 1, wherein the lead salt precipitate treatment device comprises a reactor configured to: receive the second lead salt precipitate, mix the lead salt precipitate with a hydroxide solution to form leady oxide, and output the leady oxide.

13. The system of claim 1, wherein the lead salt precipitate treatment device comprises a spray calciner configured to: receive the second lead salt precipitate, atomize the second lead salt precipitate, mix the atomized second lead salt precipitate with a gaseous stream to oxidize the second lead salt precipitate into leady oxide, and output the leady oxide.

14. The system of claim 1, wherein the lead salt precipitate treatment device comprises a stirred pot reactor configured to: receive the second lead salt precipitate, mix the second lead salt precipitate with a gaseous stream using an agitator to oxidize the second lead salt precipitate into leady oxide, and output the leady oxide.

15. A system, comprising:
a lead salt precipitation device configured to: receive and mix a carboxylate source and a lead-bearing material to form a first mixture comprising a first lead salt precipitate, and output the first mixture;
a basification device configured to: receive the first mixture from the lead salt precipitation device, increase the pH of the first mixture above 7 to dissolve the first lead salt precipitate and form a second mixture, and output the second mixture;
a first phase separation device configured to: receive the second mixture from the basification device, isolate a liquid component of the second mixture from one or more insoluble components of the second mixture, and output the liquid component;
an acidification device configured to: receive the liquid component, decrease the pH of the liquid component below 7 to form a third mixture comprising a second lead salt precipitate, and output the third mixture;

a second phase separation device configured to: receive the third mixture, isolate the second lead salt from the third mixture, and output the second lead salt precipitate; and a continuous calcination device that, during operation, is configured to: continuously receive a supply of the second lead salt precipitate; treat the second lead salt precipitate by continuously mixing the received second lead salt precipitate with a gaseous stream at a temperature less than approximately 450° C. to yield particles of leady oxide; and continuously output the particles of leady oxide.

16. The system of claim 15, wherein the continuous calcination device is configured to continuously mix the received second lead salt precipitate with the gaseous stream at a temperature of approximately 330° C. to yield the particles of leady oxide.

17. The system of claim 15, wherein the second lead salt precipitate comprises a moist lead salt solid.

18. The system of claim 15, wherein the gaseous stream is diluted with nitrogen.

19. The system of claim 15, wherein the continuous calcination device is a spray calciner configured to continuously atomize and mix the second lead salt precipitate with the gaseous stream to continuously oxidize the second lead salt precipitate into the particles of leady oxide.

20. The system of claim 15, wherein the continuous calcination device is a rotary kiln calciner configured to: continuously introduce the second lead salt precipitate into the top of a rotating tube furnace of the rotary kiln calciner, continuously mix the second lead salt precipitate with the gaseous stream to oxidize the second lead salt into the particles of leady oxide within the rotating tube furnace, and continuously output the particles of leady oxide at the bottom of the rotating tube furnace.

21. The system of claim 15, wherein the continuous calcination device is a belt dryer configured to: continuously extract the second lead salt precipitate from a liquid using a belt of the belt dryer, and continuously blow the gaseous stream over the second lead salt precipitate to both evaporate the liquid and to yield the particles of leady oxide.

22. The system of claim 15, wherein the particles of leady oxide comprise between approximately 10% and approximately 35% free lead.

23. The system of claim 15, wherein the particles of leady oxide have a $D_{50}$ between approximately 0.2 μm and approximately 20 μm.

24. The system of claim 15, wherein the particles of leady oxide have a Brunauer-Emmett-Teller (BET) surface area greater than approximately 2.5 square meters per gram ($m^2$/g).

25. The system of claim 15, wherein the particles of leady oxide have an acid absorption greater than approximately 250 milligrams $H_2SO_4$ per gram.

26. The system of claim 15, wherein the particles of leady oxide comprise less than approximately 20% beta phase lead oxide.

27. The system of claim 15, wherein the received second lead salt precipitate comprises a partially pyrolyzed lead citrate or lead acetate.

28. The system of claim 15, wherein the continuous calcination device is configured to continuously mix the received second lead salt precipitate with the gas stream at temperatures between approximately 300° C. and approximately 400° C. to yield the particles of leady oxide.

* * * * *

UNITED STATES PATENT AND TRADEMARK OFFICE
CERTIFICATE OF CORRECTION

| | | |
|---|---|---|
| PATENT NO. | : 9,757,702 B2 | Page 1 of 1 |
| APPLICATION NO. | : 14/498771 | |
| DATED | : September 12, 2017 | |
| INVENTOR(S) | : Matthew A. Spence and Patrick M. Curran | |

It is certified that error appears in the above-identified patent and that said Letters Patent is hereby corrected as shown below:

1. In Fig. 9, Sheet 7 of 9, in Step "200", Line 2, delete "LIQUID COMPONENT" and insert -- ACIDIFICATION DEVICE --, therefor.

2. In Column 2, Line 43, delete "DRAWINGS" and insert -- BRIEF DESCRIPTION OF DRAWINGS --, therefor.

3. In Column 3, Line 62, delete "tartarate," and insert -- tartrate, --, therefor.

4. In Column 7, in Table, under "Element", Line 10, delete "(Mn" and insert -- (Mn) --, therefor.

5. In Column 12, Lines 20-21, delete "separator, a clarifier," and insert -- separator, --, therefor.

6. In Column 15, Lines 53-54, delete "second phase separation device 98" and insert -- second phase separation device 92 --, therefor.

7. In Column 22, Line 17, in Claim 24, delete "2.5square" and insert -- 2.5 square --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*